H. MERRILL.
Car Wheels.
No. 138,036.  Patented April 22, 1873.
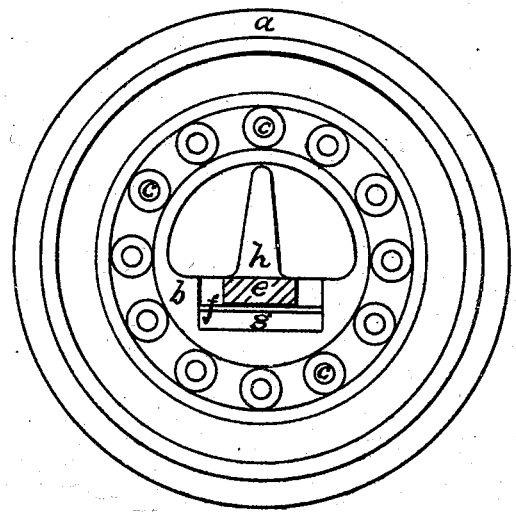
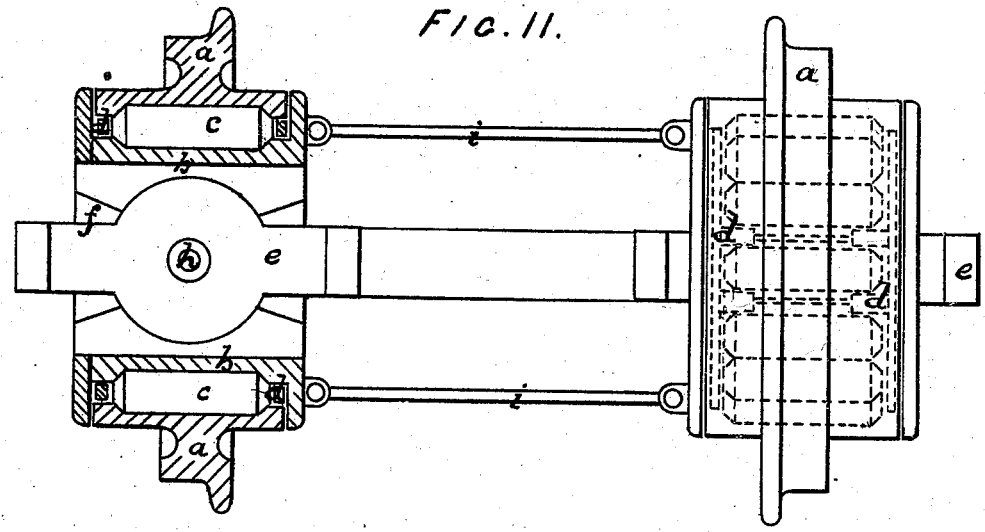
WITNESSES  INVENTOR.

UNITED STATES PATENT OFFICE.

HELEM MERRILL, OF BROOKLYN, NEW YORK.

IMPROVEMENT IN CAR-WHEELS.

Specification forming part of Letters Patent No. 138,036, dated April 22, 1873; application filed September 24, 1872.

*To all whom it may concern:*

Be it known that I, HELEM MERRILL, of Brooklyn, in the county of Kings and State of New York, have invented certain new and useful Improvements in Car-Wheels, of which the following is a specification:

Nature and Objects of the Invention.

The rollers that are ordinarily employed to diminish the friction of a wheel on its axle are hung on journals and carried by rings, which retain them in position. A large portion of the weight sustained by a pair of rollers tends to thrust them apart. This tendency is proportionately diminished by increasing the size of the circle in which the rollers travel, and there is none of it whatever when the rollers move on a right plane.

By using hubs as axles, and extending them nearly to the tires, according to my said invention, there is but little strain to displace the intervening bearing rollers, and they may be disconnected and made without journals, the tendency to lateral displacement being corrected by conical ends, with a corresponding form of the recesses in the tires and hubs in which they make their circuit. Another feature of my invention consists in carrying the hubs on a bar that is hung to the pedestals of the car, and in fitting the hub and the bar together with a circular joint in a horizontal plane, so that the wheel is free to turn on a vertical center in a line with the tread in accommodating itself by means of the flange of the tie to the curve of the rail upon which it may be running. When it is desirable, and under conditions where it may be sufficiently exact within practical limits to keep the wheels of a pair running in parallel lines, I effect this end by connecting the two hubs by a pair of equal and parallel bars in the same horizontal plane.

Description of the Drawing.

Figure 1 is an elevation of a wheel with the side plate removed, and Fig. 2 is a plan of a pair of wheels with one of them in section.

The tire $a$ runs on the stationary hub $b$, with the friction-rollers $c$ intervening. These friction-rollers are entirely disconnected and independent, and are kept apart by a pair of rings, $d$—one at each end—which have projections extending a short distance between the rollers, and are connected by suitable rods, as shown by dotted lines in the wheel of Fig. 2 that is not represented in section. The rollers should be of chilled or hard-rolled round iron. Their conical ends prevent friction between the overlapping flanges of the hub and tire. The hub is held in position by a bar, $e$, secured with the necessary springs to the pedestals of the car. The circular joint by which the hub turns on the bar is centered on a line with the tread of the wheel. The bar rests on a plate, $f$, with a layer of India-rubber between it and the hub. The bar is retained in the joint by bolting upon it the vertical stud, $h$, that rises just clear of the interior upper side of the hub. The bars $i$ connect the hubs of a pair of wheels in a horizontal plane and preserve their parallel position.

Claims.

I claim as my invention—

1. In combination with the stationary hub $b$, its outer periphery channeled to receive the friction-rollers $c$, the same having conical ends, of the tire $a$, correspondingly recessed so that the outer edges of the tire shall not come into contact with the sides of the hub, all substantially as shown and described.

2. The construction of a car-wheel with a stationary hub that can vibrate in a horizontal plane to adjust itself to a curve in the manner described.

3. The two parallel motion bars attached to the opposite sides of the stationary hub of each wheel, and connecting them substantially as shown and described.

HELEM MERRILL.

Witnesses:
  WM. KEMBLE HALL,
  EUGENE L. BUSHE.